UNITED STATES PATENT OFFICE.

WILLIAM WATKINS, OF CHICAGO, ILLINOIS.

CEMENT FOR CALKING METALLIC JOINTS.

SPECIFICATION forming part of Letters Patent No. 381,449, dated April 17, 1888.

Application filed January 16, 1888. Serial No. 260,841. (No specimens.)

*To all whom it may concern:*

Be it known that I, WILLIAM WATKINS, a citizen of the United States, residing at Chicago, in the county of Cook and State of Illinois, have invented certain new and useful Improvements in Putties for Cementing Metallic Joints; and I do declare the following to be a full, clear, and exact description of the invention, such as will enable others skilled in the art to which it appertains to make and use the same.

The invention relates to the putty used for cementing metallic joints, and has for its special object to make an article which will remain in a plastic form. Engineers complain of the putty now in use, because it requires several hours' preparation just before it is applied, and then must be used in a few days or it will become worthless. By my invention these two objections are entirely obviated.

I manufacture my iron cement or putty as follows: I mix together one part of sweet-oil and one part of molasses, then stir in this mixture the following ingredients in a comminuted or powdered state: barytes, one part; Venetian red, one part; plumbago, one and one-half part; paris-white, one and one-half part; yellow ocher, one and one-half part; litharge, one part; red lead, one part.

This compound, when thus prepared, forms a plastic mass of the usual consistence of putty, and which will remain so for years.

My iron cement or putty is especially adapted for packing steam-joints, saves much time which is now lost in making and fitting gaskets with rubber packings, hardens quickly when applied to a hot joint, and may be used with great advantage wherever red lead or putty is employed for filling or calking joints in engines or boilers.

Having thus described all that is necessary to a full understanding of my invention, what I claim as new, and desire to protect by Letters Patent, is—

An iron cement or putty formed of sweet-oil and molasses mixed with barytes, Venetian red, plumbago, paris-white, yellow ocher, litharge, and red lead, in about the proportions set forth.

In testimony whereof I affix my signature in presence of two witnesses.

WILLIAM WATKINS.

Witnesses:
ROBERT BOYD,
JAMES DILLON.